United States Patent [19]

Nakagawa et al.

[11] Patent Number: 5,245,524
[45] Date of Patent: Sep. 14, 1993

[54] DC-DC CONVERTER OF CHARGE PUMP TYPE

[75] Inventors: Shinichi Nakagawa; Hidenobu Ito, both of Kasugai, Japan

[73] Assignees: Fujitsu Limited, Kawasaki; Fujitsu VLSI Limited, Kasugai, both of Japan

[21] Appl. No.: 785,819

[22] Filed: Oct. 31, 1991

[30] Foreign Application Priority Data

Oct. 31, 1990 [JP] Japan .................................. 2-294615

[51] Int. Cl.$^5$ .......................................... H02M 3/07
[52] U.S. Cl. ........................................ 363/62; 320/1
[58] Field of Search ................. 363/60, 62; 307/110

[56] References Cited

U.S. PATENT DOCUMENTS 4,127,895 11/1978 Krueger ................................. 363/86
5,051,881 9/1991 Herold .................................. 363/60
5,132,895 7/1992 Kase .................................... 363/60

FOREIGN PATENT DOCUMENTS 217971 9/1988 Japan.
2193392 2/1988 United Kingdom.

Primary Examiner—William H. Beha, Jr.
Attorney, Agent, or Firm—Staas & Halsey

[57] ABSTRACT

A DC-DC converter includes first and second capacitors coupled in parallel, a switching part for controlling the first and second capacitors so that the first capacitor is charged by an input voltage and the second capacitor is charged by a discharging of the first capacitor, an output voltage being obtained at one end of the second capacitor, and the switching part including a discharge path through which the second capacitor is discharged. An output voltage detection units detects the output voltage and determines whether or not the output voltage satisfies a predetermined condition. A discharge path breaking units breakes the discharge path when the output voltage detection unit determines that the output voltage satisfies the predetermined condition, so that the first capacitor is prevented from being discharged through discharge path.

14 Claims, 14 Drawing Sheets

DC-DC CONVERTER OF CHARGE PUMP TYPE

BACKGROUND OF THE INVENTION

(1) Field of the Invention

The present invention relates to a DC-DC converter of a charge pump type which utilizes capacitors. A charge pump type DC-DC converter is widely used in portable electronic devices, such as a cordless telephone set. In order to design the portable electronic device to have various functions and compact dimensions it is necessary to use a stable DC-DC converter which has small voltage variation. A charge pump type DC-DC converter satisfies this requirement.

(2) Description of the Prior Art

FIG. 1 is a circuit diagram of a conventional charge pump type DC-DC converter, which comprises an input terminal 1, switches 2-5, capacitors 6 and 7, and an output terminal 8. Each of the switches 2-5 includes a CMOS (Complementary Metal Oxide Semiconductor). As shown in FIG. 2A, a DC power source, such as a battery 9 generating a voltage $V_B$, is connected between the input terminal 1 and the ground. A first pair of switches 2 and 3 and a second pair of switches 4 and 5 are alternately turned ON and OFF, so that a desired DC voltage is generated between the output terminal 8 and the ground.

In a state shown in FIG. 2B, the switches 2 and 3 are ON, and the switches 4 and 5 are OFF. A current flows in a direction indicated by solid line X, and thus the capacitor 6 is charged by the battery 9. Next, as shown in FIG. 2C, the switches 2 and 3 are turned OFF, and the switches 4 and 5 are turned ON. In this state a current flows in a direction indicated by solid line Y, so that the capacitor 6 is discharged and the capacitor 7 is charged by the charge stored in the capacitor 6. The above-mentioned switching operation is carried out repeatedly, and thus an output voltage Vo gradually decreases from zero volts and is stably maintained at a voltage $-V_B$ which is the opposite version of the voltage $V_B$ of the battery 9. FIG. 2D shows the relationship between the absolute value |Vo| and time t.

FIG. 3 is a circuit diagram of an essential part of a portable electronic device incorporating the DC-DC converter shown in FIG. 1. A predetermined load 10 is connected to the output terminal 8 of the DC-DC converter. The battery 9 is connected to an electronic circuit 11 other than the DC-DC converter. Since the battery 9 has a large internal resistance, a change in current passing through the electronic circuit 11 changes the voltage $V_B$ generated by the battery 9. Thus, the output voltage Vo varies in response to a change in the voltage $V_B$. Further, the output voltage Vo varies (decreases) due to long-term use of the battery 9 because the electromotive force of the battery 9 decreases. Furthermore, the output voltage Vo varies due to the status of the load 10.

FIG. 4 is a graph of the output voltage Vo as a function of time. The capacitor 7 is charged by the discharging of the capacitor 6 when the switches 2 and 3 are turned OFF and the switches 4 and 5 are turned ON. If the capacitors 6 and 7 have identical capacitances, the output voltage Vo decreases to $-V_B'$ [V] (a→b). Then, current is supplied to the load 10 by the discharging the capacitors 6 and 7, and hence the output voltage Vo increases (b→c). When the switches 2 and 3 are turned ON and the switches 4 and 5 are turned OFF, current is supplied to the load 10 by the discharging of only the capacitor 7. Hence, the output voltage Vo increases in such a way that an increasing curve obtained during this time (c→d) has a slope approximately twice that obtained between times b and c. As described above, the output voltage Vo of the conventional DC-DC converter shown in FIG. 1 is greatly affected by the load 10.

In order to design the DC-DC converter shown in FIG. 1 so that it operates at a high speed, it is necessary to design the MOS transistors forming the switches 2-5 so that they have small ON resistances. In order to obtain small ON resistances of the MOS transistors, it is necessary to design the MOS transistors so that they have wide areas or design the capacitors 6 and 7 so that they have small capacitances. However, the increasing of the area of each MOS transistor prevents improvement in the integration density, and the decreasing of the capacitance of each of the capacitors 6 and 7 decreases the load driving ability of the DC-DC converter.

FIG. 5 is a circuit diagram of a variation of the conventional DC-DC converter shown in FIG. 1. The output voltage Vo obtained at the output terminal 8 shown in FIG. 5 has a positive voltage higher than the ground potential, while the output voltage Vo obtained at the output terminal 8 shown in FIG. 1 has a negative voltage lower than the ground potential. The circuit shown in FIG. 5 has the same disadvantages as the circuit shown in FIG. 1.

SUMMARY OF THE INVENTION

A general object of the present invention is to provide a DC-DC converter in which the above-mentioned disadvantages are eliminated.

A more specific object of the present invention is to provide a DC-DC converter capable of generating a DC output voltage without being affected by a variation in a DC input voltage or by a load driven by the DC-DC converter.

The above objects of the present invention are achieved by a DC-DC converter comprising first and second capacitors coupled in parallel; switching means, coupled to the first and second capacitors, for controlling the first and second capacitors so that the first capacitor is charged by an input voltage and the second capacitor is charged by a discharging of the first capacitor, an output voltage being obtained at one end of the second capacitor, and the switching means including a discharge path through which the second capacitor is discharged; output voltage detection means, coupled to the second capacitor, for detecting the output voltage and for determining whether or not the output voltage satisfies a predetermined condition; and discharge path breaking means, coupled to the discharge path and the output voltage detection means, for breaking the discharge path when the output voltage detection means determines that the output voltage satisfies the predetermined condition, so that the first capacitor is prevented from being discharged through the discharge path.

DESCRIPTION OF THE PREFERRED EMBODIMENTS

Other objects, features and advantages of the present invention will become more apparent from the following detailed description when read in conjunction with the accompanying drawings, in which.

DESCRIPTION OF THE PREFERRED EMBODIMENTS

Figure 6A:
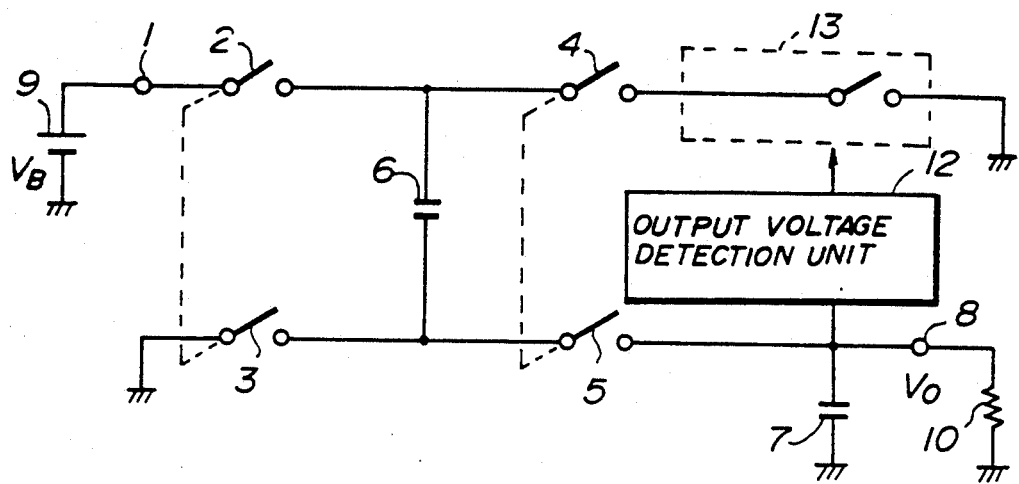
FIG. 6A is a circuit diagram of a DC-DC converter according to a first preferred embodiment of the present invention.

FIG. 6A is a circuit diagram of a schematic of a DC-DC converter according to a first preferred embodiment of the present invention. In FIG. 6A, those parts which are the same as those shown in the previous figures are given the same reference numerals. As shown in FIG. 6A, an output voltage detection unit 12 and a discharge path breaking unit 13 are added to the circuit configuration shown in FIG. 1. The output voltage detection unit 12 detects the output voltage Vo obtained at the output terminal 8, and compares the absolute value of the output voltage Vo with a predetermined threshold value Vc smaller than the absolute value of the DC voltage $V_B$. When the absolute value of the output voltage Vo is greater than the threshold value Vc, the output voltage detection unit 12 controls the breaking unit 13 so that a discharge path of the capacitor 6 is broken.

Figure 6B:
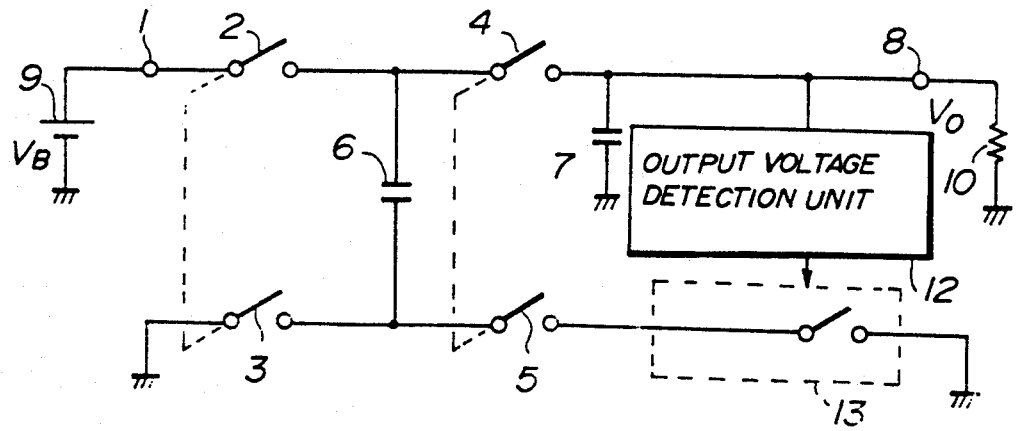
FIG. 6B is a circuit diagram of a variation of the DC-DC converter shown in FIG. 6A.

FIG. 6B is a circuit diagram of a version of the circuit configuration shown in FIG. 6A. The output voltage Vo of the circuit shown in FIG. 6B is a positive voltage while the output voltage Vo of the circuit shown in FIG. 6A is a negative voltage.

The DC-DC converter shown in FIG. 6A generates an output voltage Vo equal to either −Vc (FIG. 6A) or Vc (FIG. 6B). Since the absolute value of the threshold voltage Vc is smaller than the absolute value of the battery voltage $V_B$ ($|\pm Vc| < |\pm V_B|$), the output voltage Vo will not change if the voltage $\pm V_B$ changes in a range of $|\pm V_B| - |\pm Vc| > 0$.

In the case where current passes through the load 10, supply of the current to the load 10 is performed by only the capacitor 7 during the time the switches 2 and 3 are ON and the switches 4 and 5 are OFF. Thus, the output voltage Vo may vary due to the influence of the load 10. However, the output voltage Vo is fixed without being affected by the load 10 while the switches 2 and 3 are OFF and the switches 4 and 5 are ON.

It will be noted that the discharge path breaking unit 13 is provided separately from the switches 4 and 5. However, it is possible to realize the discharge path breaking unit 13 by means of the switch 4 or the switch 5. In each of the circuits shown in FIGS. 6A and 6B, it is also possible to connect the battery 9 so that the plus terminal thereof is grounded and the minus terminal thereof is connected to the input terminal 1. In this alternative, the output voltage Vc is a positive voltage.

Figure 7:
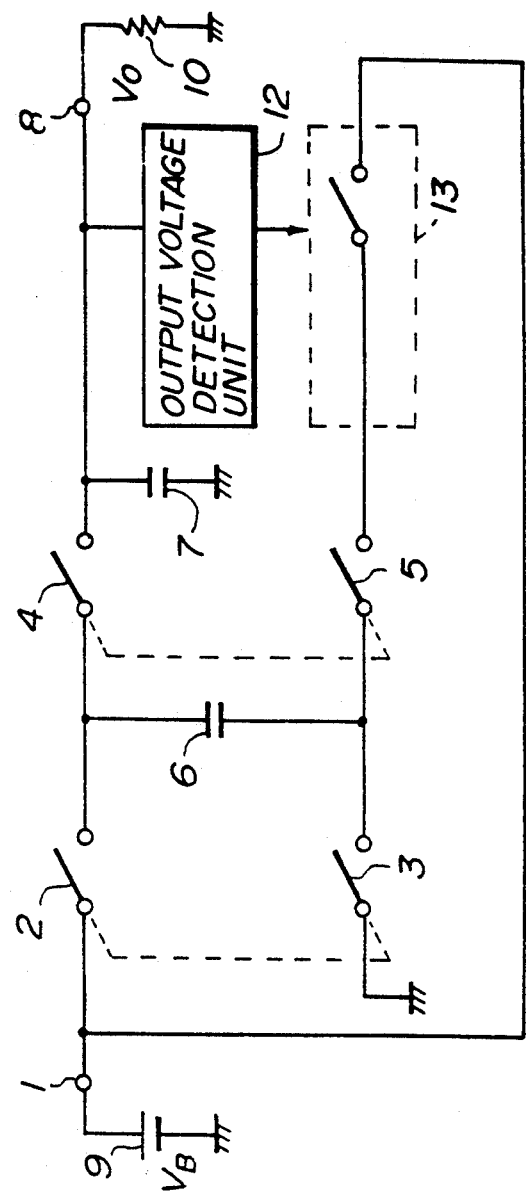
FIG. 7 is a circuit diagram of a DC-DC converter according to a second preferred embodiment of the present invention.

FIG. 7 is a circuit diagram of an outline of a DC-DC converter according to a second preferred embodiment of the present invention. The output voltage detection unit 12 and the discharge path breaking unit 13 as shown in FIG. 6B are provided in the same manner. One end of the switch 13 is not grounded but rather connected to the plus terminal of the battery 9. The output voltage detection unit 12 detects the output voltage Vo and compares the absolute value of the output voltage Vo with a predetermined threshold value 2 Vd which is smaller than twice the absolute value of the battery voltage $V_B$. When the absolute value of the output voltage Vo is greater than the predetermined threshold voltage 2 Vd, the output voltage detection unit 12 controls the discharge path breaking unit 13 so that the discharge path for the capacitor 7 is broken.

The DC-DC converter shown in FIG. 7 generates the output voltage Vo equal to either 2 Vd (or −2 Vd, as will be described later). Since the absolute value of the threshold voltage 2 Vd is smaller than the absolute value of the battery voltage $V_B$ ($|\pm 2 Vd| < |\pm 2 V_B|$), the output voltage Vo will not change if the voltage $\pm V_B$ changes in a range of $|\pm 2 V_B| - |\pm 2 Vd| > 0$.

In the case where current passes through the load 10, the supply of the current to the load 10 is performed by only the capacitor 7 during the time the switches 2 and 3 are ON and the switches 4 and 5 are OFF. Thus, the output voltage Vo may vary due to the influence of the load 10. However, the output voltage Vo is fixed without being affected by the load 10 while the switches 2 and 3 are OFF and the switches 4 and 5 are ON.

It will be noted that the discharge path breaking unit 13 shown in FIG. 7 is provided separately from the switches 4 and 5. However, it is possible to realize the discharge path breaking unit 13 by means of the switch 4 or switch 5. It is also possible to connect the battery 9 so that the plus terminal thereof is grounded and the minus terminal thereof is connected to the input terminal 1. In this alternative, the output voltage 2 Vd is a negative voltage.

Figure 8:
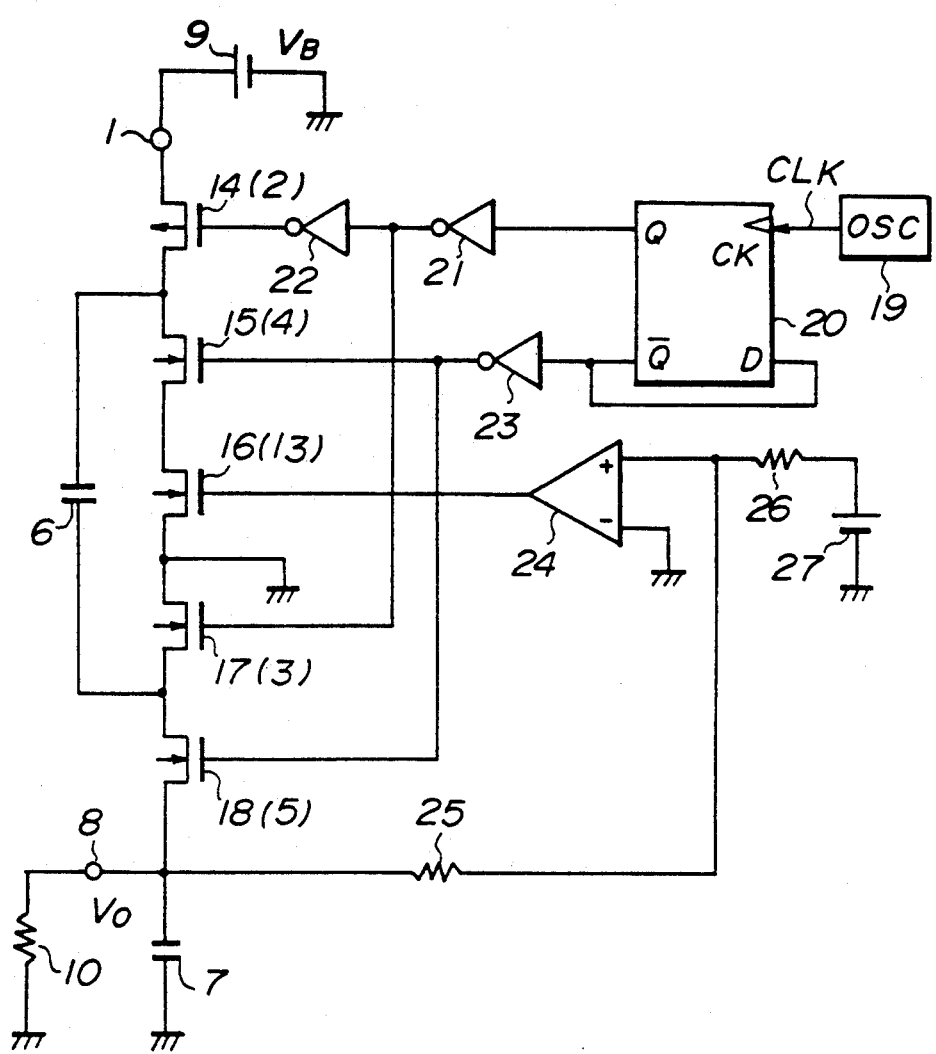
FIG. 8 is a circuit diagram showing the first embodiment of the present invention in more detail.

FIG. 8 is a circuit diagram showing the circuit of FIG. 6A in more detail. In FIG. 8, those parts which are the same as those shown in the previously described figures are given the same reference numerals. A p-channel MOS transistor (hereafter simply referred to as pMOS transistor) 14 forms the switch 2 shown in FIG. 6A, and an n-channel MOS transistor (hereafter simply referred to as nMOS transistor) 17 forms the switch 3. An nMOS transistor 15 forms the switch 4, and an nMOS transistor 18 forms the switch 5. An nMOS transistor 16 forms the discharge path breaking unit 13.

The circuit shown in FIG. 8 further includes an oscillator 19 generating a clock signal CLK, a D-type flip-flop 20 and inverters 21-23. The oscillator 19, the flip-flop 20 and the inverters 21-23 control the switching operation on the pMOS transistor 14 and the nMOS transistors 15, 17 and 18. Further, the circuit shown in FIG. 8 includes an operational amplifier 24, resistors 25 and 26, and a constant-voltage source 27, all of which form the output voltage detection unit 12 shown in FIG. 6A. The resistors 25 and 26 have a relationship such that R25×V27=R26×Vc where R25 and R26 are the resistance values of the resistors 25 and 26, respectively, V27 is the voltage of the constant-voltage source 27, and −Vc is a target value of the output voltage Vo (Vc<$V_B$). That is, the output terminal of the operational amplifier 24 switches to a low level "L" when the output voltage Vo becomes lower than −Vc. Thus, the nMOS transistor 16 turns OFF, and thus the discharge path for the capacitor 6 is broken.

When the power to the circuit shown in FIG. 8 is turned ON, and in the initial state immediately after the power supply is turned ON, the output voltage Vo is equal to 0 [V]. Thus, the output terminal of the operational amplifier 24 is maintained at a high level "H" and the nMOS transistor 16 is ON.

Figure 9A:
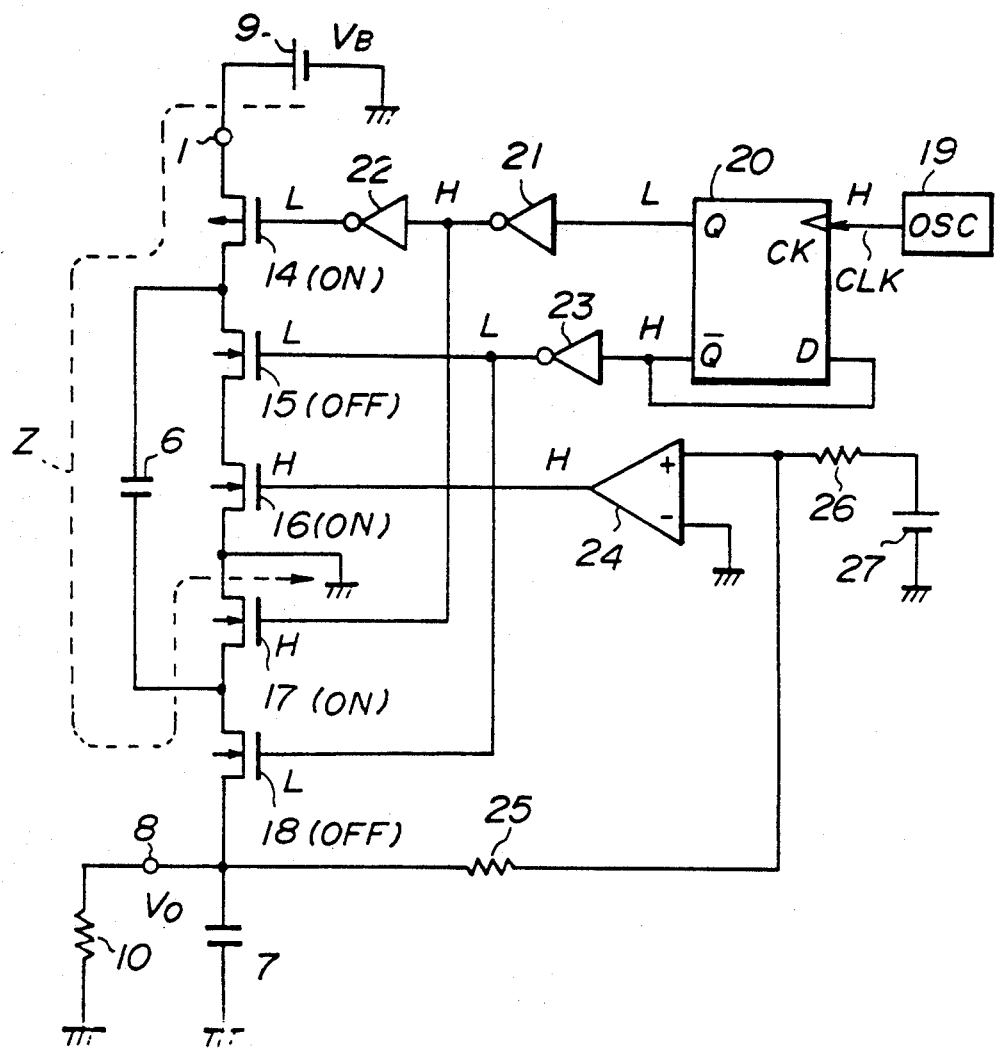
FIGS. 9A, 9B, 9C, 9D, 9E and 9F are diagrams showing the operation of the circuit shown in FIG. 8.

It is now assumed that the Q and $\bar{Q}$ output terminals of the D-type flip-flop 20 are respectively at the high level "H" and the low level "L". As shown in FIG. 9A, the clock signal CLK generated by the oscillator 19 switches to the high level "H", and the Q and $\bar{Q}$ output terminals of the flip-flop 20 switch to the low level "L" and the high level "H". Thus, the output terminals of the inverters 21 and 22 become the high level "H" and the low level "L", respectively, and the output terminal of the inverter 23 becomes the low level "L". Hence, the pMOS transistor 14 and the nMOS transistor 17 are turned ON, and current passes through a path indicated by a broken line Z. In this manner, the capacitor 6 is charged.

Figure 9B:
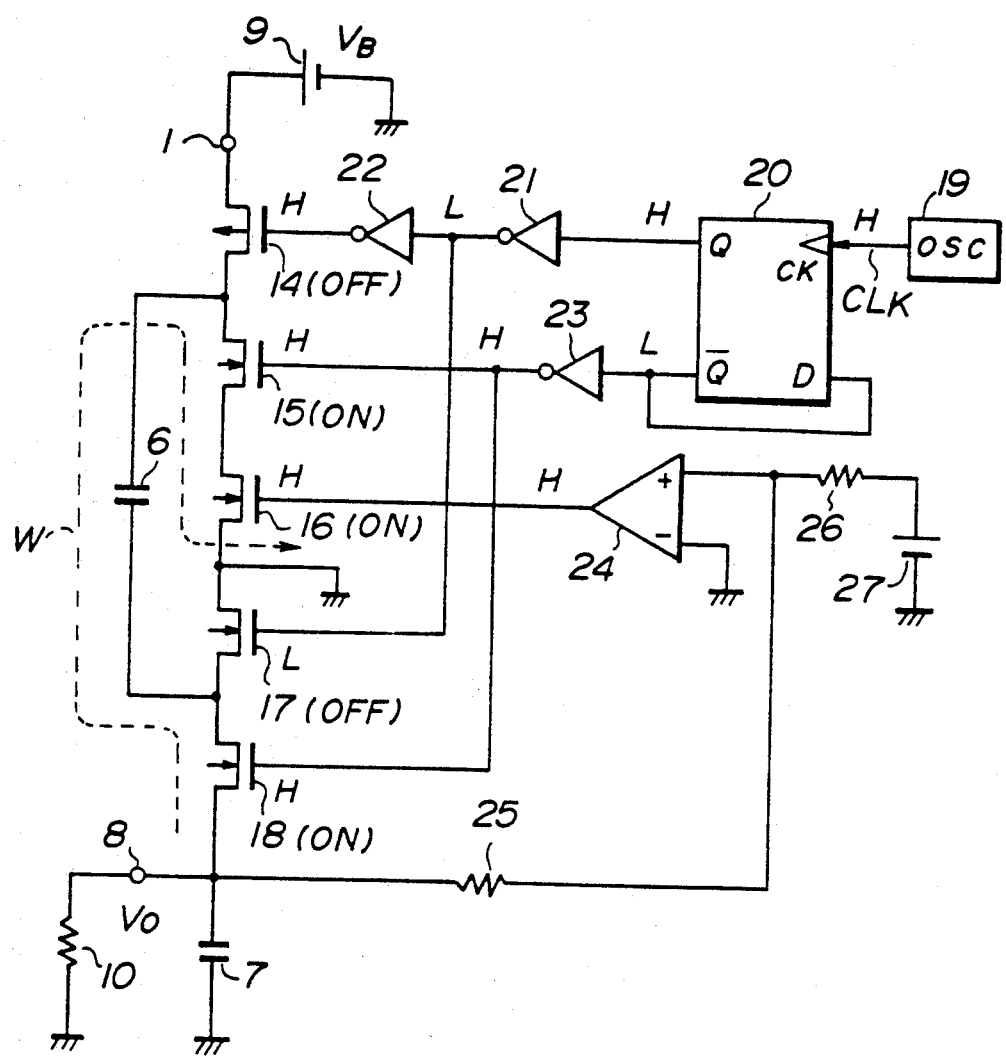

As shown in FIG. 9B, when the clock signal CLK switches to the low level "L" and then becomes the high level "H" again, the Q and $\bar{Q}$ output terminals of the D-type flip-flop 20 switch to the high level "H" and the low level "L", respectively. Thus, the output terminals of the inverters 21 and 22 become the low level "L" and the high level "H", respectively, and the output terminal of the inverter 23 becomes the high level "H". Thus, the pMOS transistor 14 and the nMOS transistor 17 are turned OFF, and the nMOS transistors 15 and 18 are turned ON. Thus, current passes through a path indicated by a broken line W. In this manner, the capacitor 6 is discharged and the capacitor 7 is charged.

The above-mentioned switching operation is repeatedly carried out, so that the output voltage Vo decreases toward −$V_B$. When the output voltage Vo becomes equal to −Vc, the non-inverting input terminal of the operational amplifier 24 has a voltage equal to or lower than 0 [V]. Thus, the output terminal of the operational amplifier 24 becomes the low level "L", and the nMOS transistor 16 goes to the OFF state. As a result, the output voltage Vo is stably maintained at the voltage −Vc. As will be described later, even when current passes through the load 10, the output voltage Vo is maintained at −Vc during the time the nMOS transistors 15 and 18 are ON.

Figure 9C:
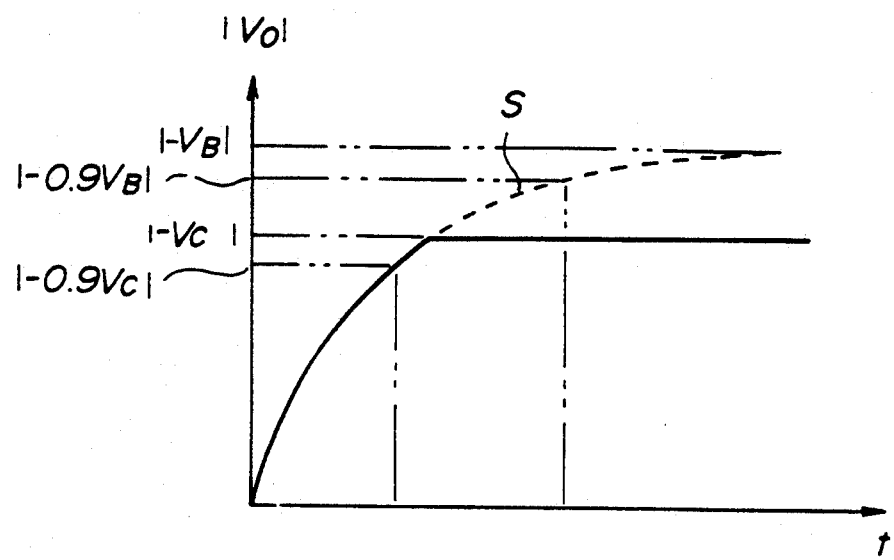

FIG. 9C shows the relationship between the absolute value of the output voltage Vo and time t. A broken line S in FIG. 9C shows the change in the absolute value of the output voltage Vo generated by the conventional DC-DC converter shown in FIG. 1, and can be expressed as follows:

$$V_B \sum_{k=1}^{\infty} (1/2^k).$$

If the rise time is set to be 90% of the target value and the following condition is defined:

$$Vc = (\tfrac{3}{4})V_B$$

the following relationships are obtained:

$$0.9\ V_B < V_B(\tfrac{1}{2}+\tfrac{1}{4}+\tfrac{1}{8}+1/16)$$

$$0.9\ V_B = 0.675\ V_B < V_B(\tfrac{1}{2}+\tfrac{1}{4}).$$

Figure 1:
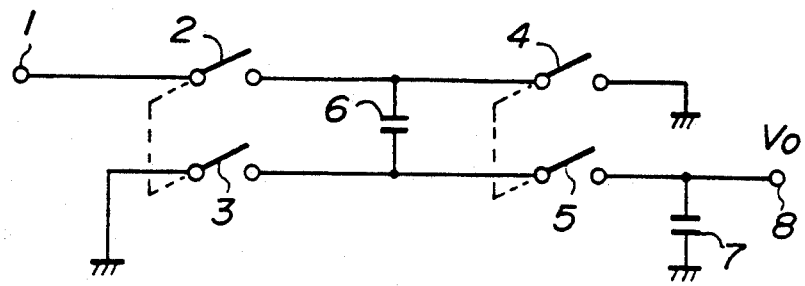
FIG. 1 is a circuit diagram of a conventional DC-DC converter.
Figure 2A:
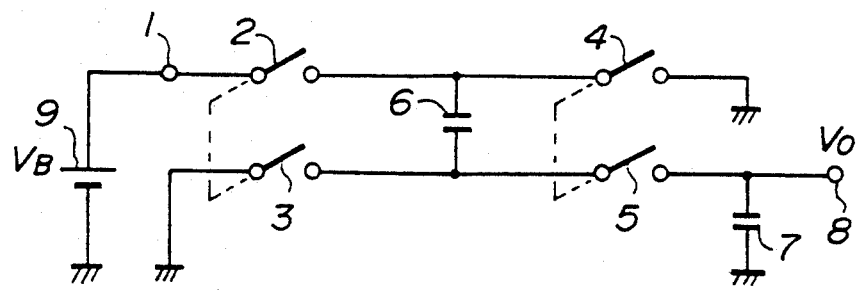
FIGS. 2A, 2B, 2C and 2D are diagrams showing the operation of the conventional DC-DC converter shown in FIG. 1.
Figure 2B:
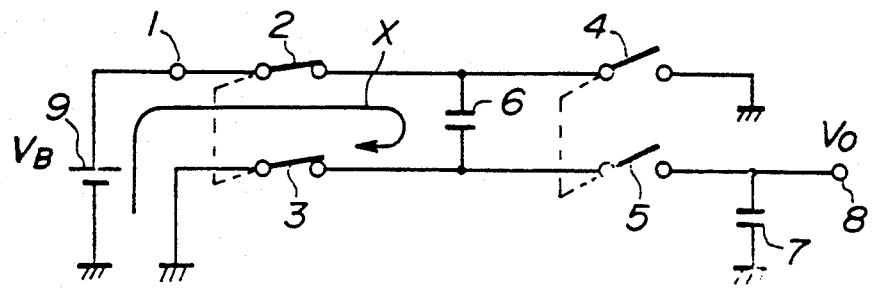
Figure 2C:
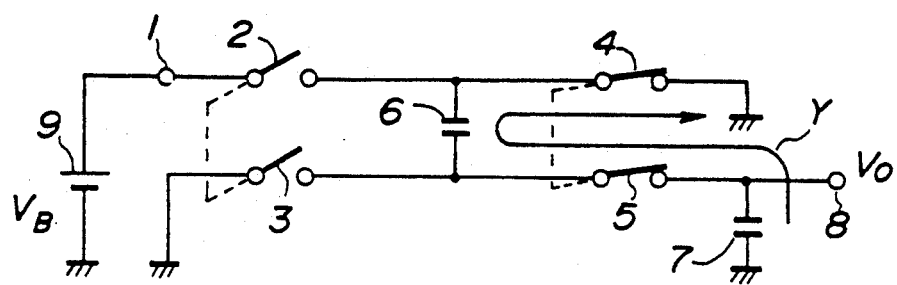
Figure 2D:
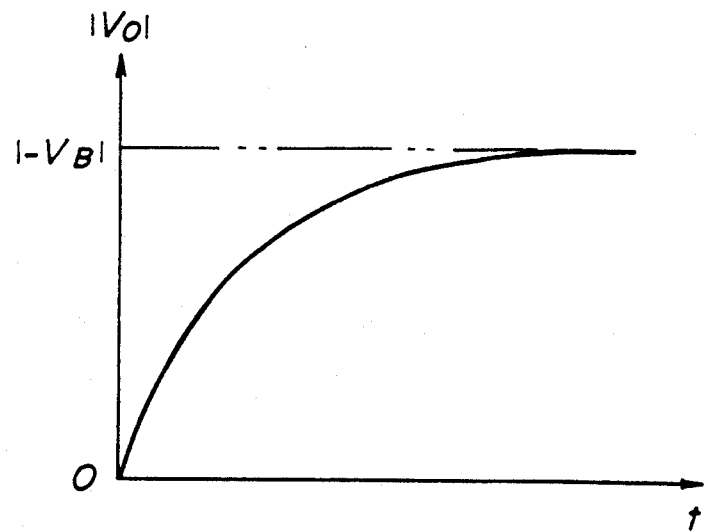
Figure 3:
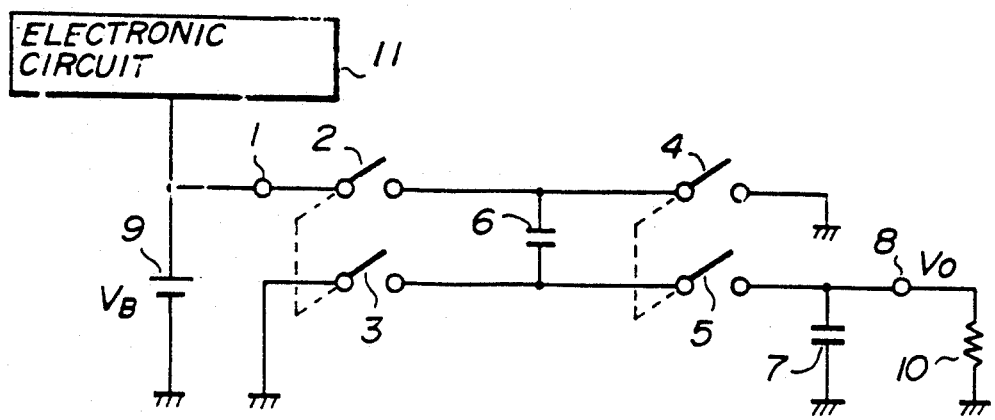
FIG. 3 is a circuit diagram of a portable electronic device having the conventional DC-DC converter shown in FIG. 1.
Figure 4:
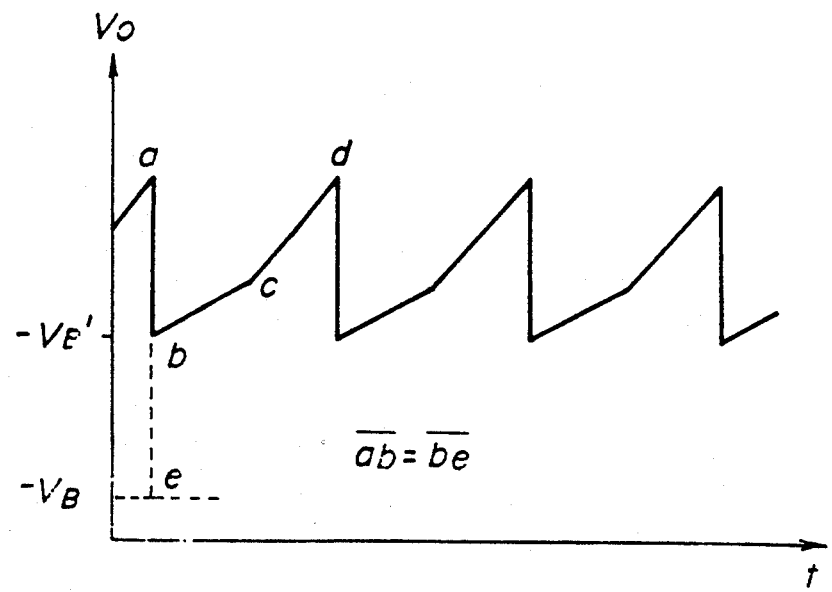
FIG. 4 is a graph illustrating a disadvantage of the conventional DC-DC converter shown in FIG. 1.
Figure 5:
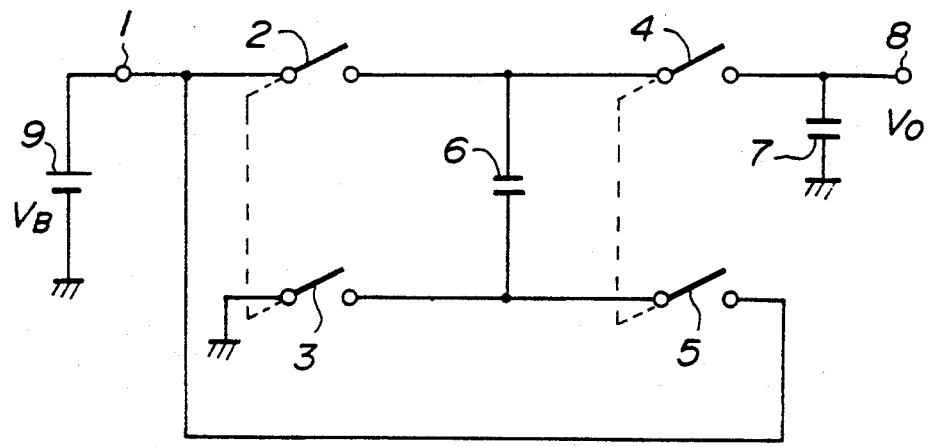
FIG. 5 is a circuit diagram of another conventional DC-DC converter.
Figure 9D:
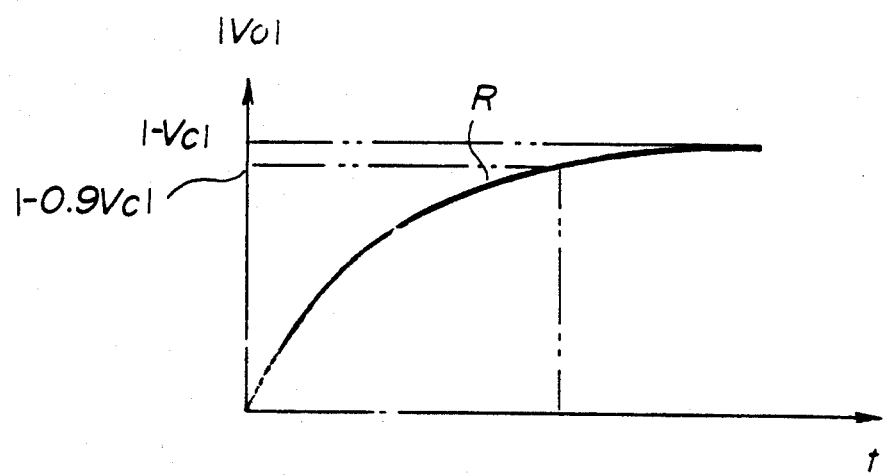

Thus, the rise time of the circuit shown in FIG. 8 is shorter than that of the conventional DC-DC converter shown in FIG. 1. FIG. 9D shows a change in the absolute value of the output voltage as a function of time in the conventional DC-DC converter in which the battery voltage $V_B$ is set equal to Vc.

Figure 9E:
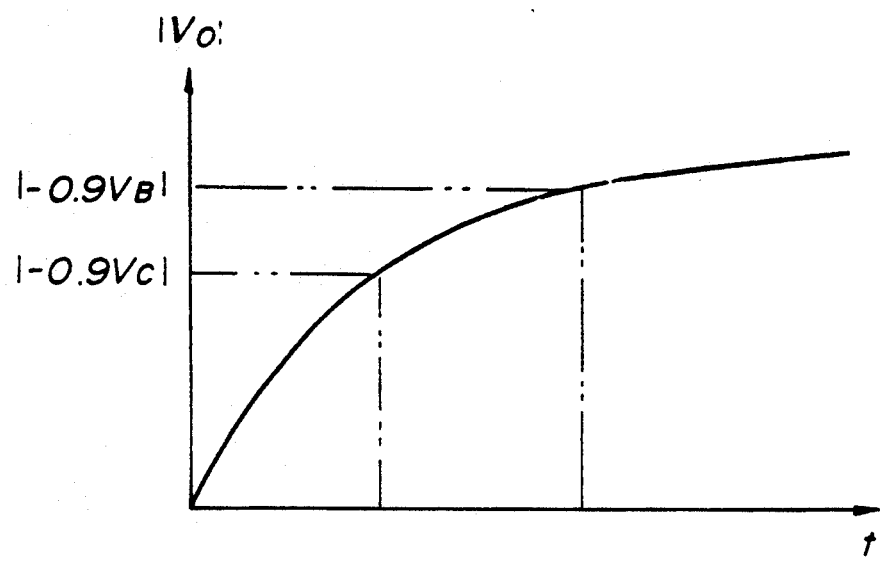

The curves S and R respectively shown in FIGS. 9C and 9D are related to the case where each switch has a small ON resistance. When each switch has a large ON resistance or each of the capacitors 6 and 7 has a large capacitance, the relationship $$V = [(1 - \exp(-t/CR)]V_B$$

is obtained. This relationship is illustrated in FIG. 9E. If each of the capacitors 6 and 7 has a capacitance of 1 μF, and the load 10 has a resistance of 1KΩ the conventional DC-DC converter shown in FIG. 1 has a rise time equal to 2.3 ms. Meanwhile, the DC-DC converter of the first embodiment of the present invention has a rise time of 1.12 ms when Vc=($\tfrac{3}{4}$)$V_B$. That is, the first embodiment is 1.18 ms faster than the conventional DC-DC converter.

Figure 9F:
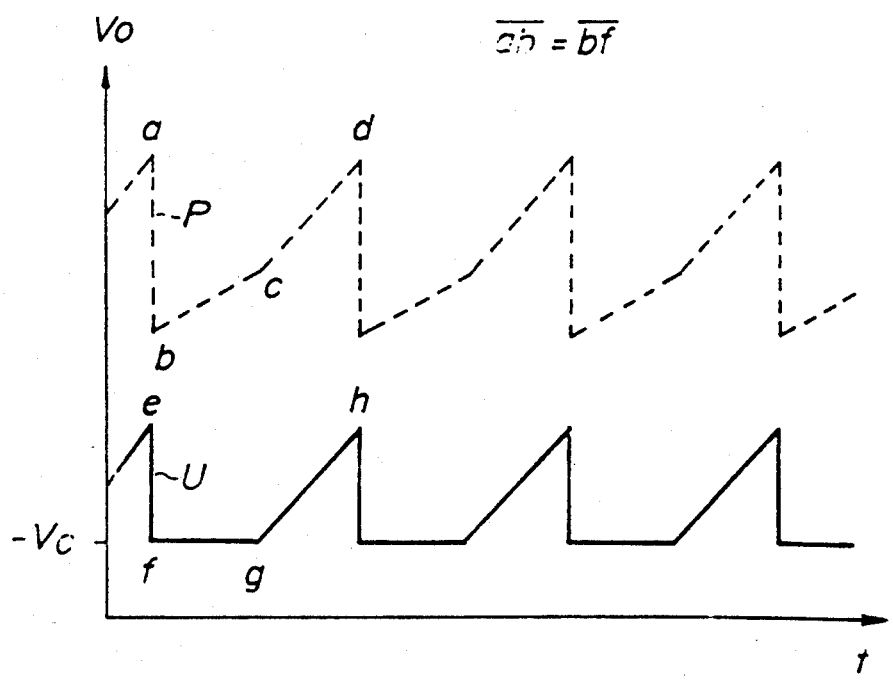

FIG. 9F shows a variation in the output voltage Vo affected by the load 10 in the case where the output voltage Vo is in the stationary state. When the pMOS transistor 14 and the nMOS transistor 17 switch OFF and the nMOS transistors 15 and 18 switch ON, the capacitor 7 is charged by the discharging of the capacitor 6. Hence, the output voltage V0 decreases to −Vc (e→f), and the nMOS transistor 16 is turned OFF. After that, current is supplied to the load 10 by the discharging of the capacitor 7. The output voltage Vo tends to increase due to the discharging of the capacitor 7. However, the nMOS transistor 16 is turned ON, and the capacitor 7 starts to be charged by the discharging of the capacitor 6 at the same time as the capacitor 7 is discharged. In other words, the supply of current to the load 10 is carried out by only the capacitor 6, and thus the potential of the capacitor 7 does not move. Thus, the output voltage Vo is controlled to −Vc (f→g). When the pMOS transistor 14 and nMOS transistor 17 are turned ON, and the nMOS transistors 15 and 18 are turned OFF, current passes through the load 10 by only the discharging of the capacitor 7. Hence, the output voltage Vo increases so that a curve of output has the same slope as that of the conventional DC-DC converter shown in FIG. 1 (g→h). A broken line P shows a change in the output voltage Vo obtained when the output terminal 8 shown in FIG. 1 is connected to the load 10.

According to the first embodiment of the present invention, it is possible to generate the output voltage Vo equal to $-V_c$. Since the $V_c$ and $V_B$ have the relationship that $V_c<V_B$, the output voltage Vo does not vary if the battery voltage $V_B$ varies in the range of $(V_B-V_c)>0$.

In the state where the load 10 is connected to the output terminal 8, the supply of current to the load 10 is carried out by only the capacitor 7 during the time the pMOS transistor 14 and the nMOS transistor 17 are ON and the nMOS transistors 15 and 18 are OFF. Thus, the output voltage Vo varies due to the influence of the load 10. However, the output voltage is maintained at $-V_c$ without being affected by the load 10 during the time the pMOS transistor 14 and the nMOS transistor 17 are OFF and the nMOS transistors 15 and 18 are ON. Further, the rise time of the output voltage Vo can be shortened since the target voltage $V_c$ is set lower than the battery voltage $V_B$.

Figure 10:
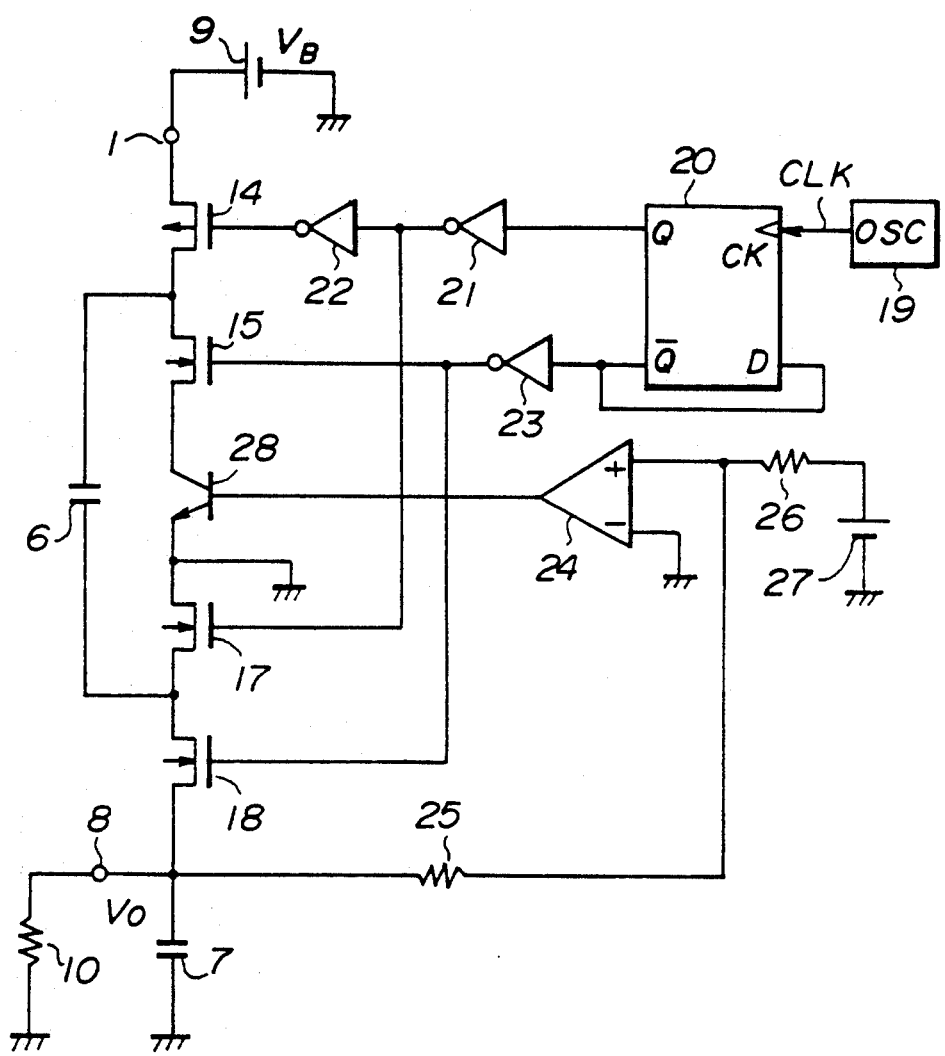
FIG. 10 is a circuit diagram of a first variation of the circuit shown in FIG. 8.

FIG. 10 is a circuit diagram of a first variation of the first embodiment of the present invention. The discharge path breaking unit 13 is formed with an npn transistor 28. The circuit configuration shown in FIG. 10 has the same advantages as the circuit configuration shown in FIG. 8.

Figure 11:
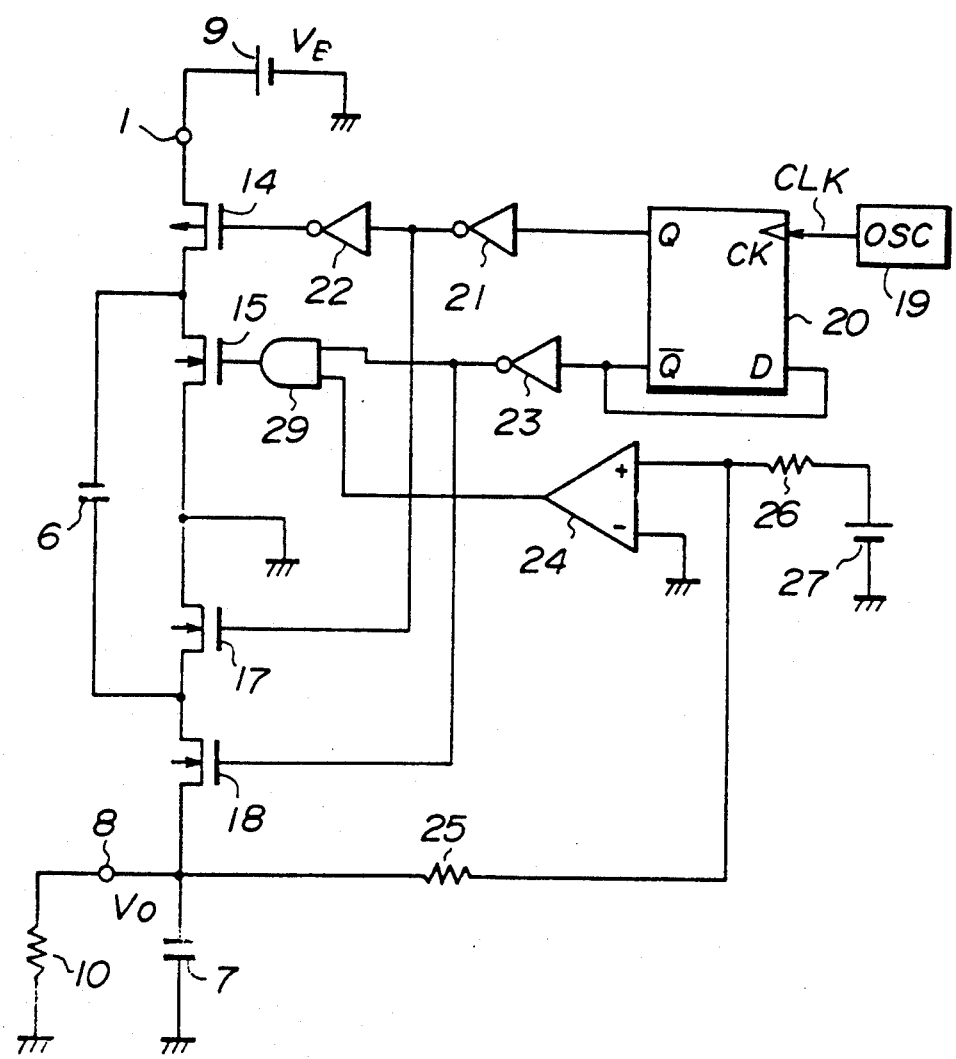
FIG. 11 is a circuit diagram of a second variation of the circuit shown in FIG. 8.

FIG. 11 is a circuit diagram of a second variation of the first embodiment of the present invention. The discharge path breaking unit 13 of the second variation is composed of an nMOS transistor 15 and an AND circuit 29. The AND circuit 29 executes an AND operation on the output signal of the inverter 23 and the output signal of the operational amplifier 24. The output signal of the AND circuit 29 is supplied to the gate of the nMOS transistor 15. The second variation shown in FIG. 11 has the same advantages as the first embodiment of the present invention. It is also possible to apply the output signal of the AND circuit 29 to the gate of the nMOS transistor 18.

Figure 12:
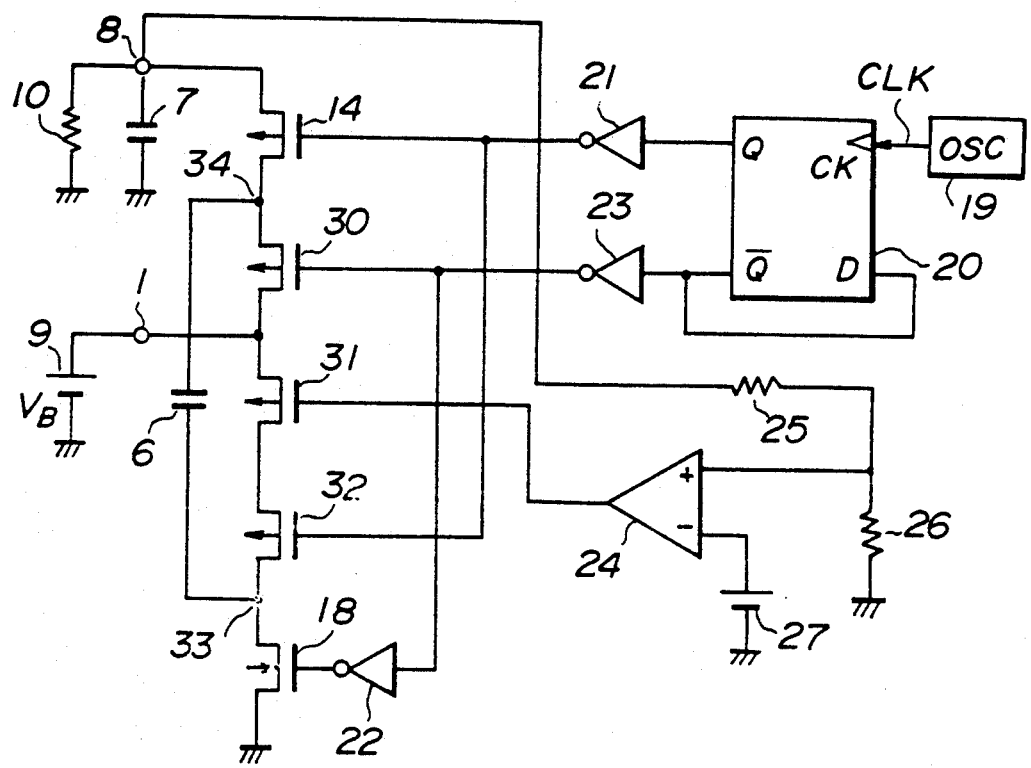
FIG. 12 is a circuit diagram showing the second embodiment illustrated in FIG. 7 in more detail.

FIG. 12 is a circuit diagram showing the circuit configuration of FIG. 6B in more detail. In FIG. 12, those parts which are the same as those shown in the previously described figures are assigned the same reference numerals. The nMOS transistors 15, 16 and 17 shown in FIG. 8 are replaced by pMOS transistors 30, 31 and 32, respectively. The output voltage detection unit 12 is composed of the operational amplifier 24, the resistors 25 and 26 and the constant-voltage source 27, as shown in FIG. 12. If the resistance R25 of the resistor 25 is set equal to the resistance R26 of the resistor 26 and the target voltage is set equal to 2 Vd, the constant-voltage source 27 having a voltage equal to Vd ($<V_B$) is used.

When the output voltage Vo becomes equal to or greater than 2 Vd, the gate voltage of the pMOS transistor 31 becomes the high level "H". When the output voltage Vo becomes smaller than 2 Vd, the gate voltage of the pMOS transistor 31 becomes the low level "L", and thus the discharging is carried out.

The Q and $\overline{Q}$ output terminals of the D-type flip-flop 20 are at the low level and the high level, respectively, the output signal of the inverter 21 at the high level "H", and the pMOS transistors 14 and 32 are OFF. At this time, the output terminal of the inverter 23 is at the low level "H", and the pMOS transistor 30 is ON. At this time, the output terminal of the inverter 22 has the high level "L", and the nMOS transistor 18 is ON. As a result, the capacitor 6 is charged.

When the clock signal CLK switches to the high level "H", the Q and $\overline{Q}$ output terminals of the D-type flip-flop 20 become the high level "H" and the low level "L", respectively. Hence, the output terminal of the inverter 21 switches to the low level "L", and the output terminal of the inverter 23 switches to the high level "H", and the output terminal of the inverter 22 switches to the low level "L". Hence, the pMOS transistors 14 and 32 are ON, and the pMOS transistor 30 and the nMOS transistor 18 are OFF. Thus, the potential at the node 33, which was previously at the ground level, becomes the battery voltage $V_B$, and thus the capacitor 6 is charge-pumped. The potential of the opposite node 34 becomes 2 $V_B$, and thus the capacitor 7 is charged by the voltage 2 $V_B$, while the output voltage detection unit 12 controls the output voltage Vo to 2 Vd. According to the second embodiment of the present invention, the rise time of the output voltage Vo can be shortened since 2 Vd<2 $V_B$.

The signal oscillated by the oscillator 19 can have an arbitrary frequency equal to, for example, 100 kHz. The source 27 can be formed with a bandgap regulator. In this case, the voltage generated by the source 27 is set smaller than the battery voltage $V_B$ and the output voltage Vo.

The present invention is not limited to the specifically disclosed embodiments, and variations and modifications may be made without departing from the scope of the present invention.

What is claimed is:

1. A DC-DC converter receiving an input voltage and comprising:
   first and second capacitors coupled in parallel;
   switching means, coupled to said first and second capacitors, for controlling said first and second capacitors so that the first capacitor is charged by the input voltage and the second capacitor is charged by a discharging of the first capacitor, an output voltage being obtained at one end of the second capacitor, and said switching means including a discharge path through which the first capacitor is discharged;
   output voltage detection means, coupled to the second capacitor, for detecting the output voltage and for determining whether or not the output voltages satisfies a predetermined condition in accordance with which an absolute value of a first discharge voltage obtained at a time interval during which the first and second capacitors are being discharged is greater than an absolute value of a second discharge voltage obtained when only the second capacitor is being discharged; and
   discharge path breaking means, coupled to the discharge path and said output voltage detection means, for breaking the discharge path when said output voltage detection means determines that the output voltage satisfies the predetermined condition, so that the first capacitor is prevented from being discharged through the discharge path.

2. A DC-DC converter as claimed in claim 1, wherein said output voltage detection means comprises means for comparing an absolute value of the output voltage with a predetermined threshold value smaller than an absolute value of the input voltage and for breaking the discharge path when the absolute value of the output voltage is greater than the predetermined threshold value.

3. A DC-DC converter as claimed in claim 1, wherein said discharge path breaking means comprises a switch which is provided in the discharge path and controlled by said output voltage detection means.

4. A DC-DC converter as claimed in claim 3, wherein:
said output voltage detection means comprises means for generating a control signal in accordance with whether or not the output voltage satisfies the predetermined condition; and
said switch comprises a transistor having first and second terminals through which the transistor is provided in the discharge path, and a control terminal receiving the control signal.

5. A DC-DC converter as claimed in claim 4, wherein said transistor is a MOS transistor.

6. A DC-DC converter as claimed in claim 4, wherein said transistor is a bipolar transistor.

7. A DC-DC converter as claimed in claim 4, wherein said output voltage detection means comprises an operational amplifier having a first input terminal coupled to said one end of the second capacitor, a second input terminal receiving a reference voltage signal, and an output terminal via which the control signal is applied to the control terminal of the transistor.

8. A DC-DC converter as claimed in claim 7, wherein the output voltage detection means comprises:
a first resistor provided between said one end of the second capacitor and the first input terminal of the operational amplifier;
a DC voltage source; and
a second resistor connecting the DC voltage source to the firs input terminal of the operational amplifier.

9. A DC-DC converter as claimed in claim 1, further comprising a DC power source generating the input voltage.

10. A DC-DC converter as claimed in claim 1, wherein said switching means comprises a first switch selectively applying the input voltage to a first end of the first capacitor, a second switch selectively grounding a second end of the first capacitor, a third switch selectively connecting the first end of the first capacitor to the discharge path, and a fourth switch selectively connecting a first end of the second capacitor, which corresponds to said one end of the second capacitor, to the second end of the first capacitor, a second end of the second capacitor being grounded.

11. A DC-DC converter as claimed in claim 1, wherein said switching means comprises a first switch selectively applying the input voltage to a first end of the first capacitor, a second switch selectively grounding a second end of the first capacitor, a third switch selectively connecting a first end of the second capacitor to the first end of the first capacitor, and a fourth switch selectively connecting the second end of the first switch to the discharge path, a second end of the second capacitor being grounded.

12. A DC-DC converter as claimed in claim 1, wherein said switching means further comprises means for charging the second capacitor with the input voltage.

13. A DC-DC converter as claimed in claim 12, wherein said output voltage detection means comprises means for comparing an absolute value of the output voltage with a predetermined threshold value, smaller than twice an absolute value of the input voltage, and for breaking the discharge path when the absolute value of the output voltage is greater than the predetermined threshold value.

14. A DC-DC converter as claimed in claim 12, wherein said switching means comprises a first switch selectively applying the input voltage to a first end of the first capacitor, a second switch selectively grounding a second end of the first capacitor, a third switch selectively connecting a first end of the second capacitor to the first end of the first capacitor, and a fourth switch selectively applying the input voltage to the second end of the first capacitor via the discharge path.

* * * * *